United States Patent

[11] 3,551,589

[72] Inventor Irving Moskovitz
Roslyn Heights, N.Y.
[21] Appl. No. 625,554
[22] Filed Mar. 23, 1967
[45] Patented Dec. 29, 1970
[73] Assignee Ward Electronic Industries
a corporation of New Jersey. by mesne assignments

[54] APPARATUS FOR CONVERTING MONOCHROME TELEVISION SIGNALS TO COLOR SIGNALS
7 Claims, 3 Drawing Figs.

[52] U.S. Cl. ........ 178/5.4
[51] Int. Cl. ........ H04n 9/04
[50] Field of Search ........ 178/5.2, 5.4, 5.2D, 5.4(5), 5.4C, 5.4(10), 5.4(9), 5.4STC; 328/188

[56] References Cited
UNITED STATES PATENTS

| | | | |
|---|---|---|---|
| 2,874,212 | 2/1959 | Bechley | 178/5.4 |
| 3,258,528 | 6/1966 | Oppenheimer | 178/5.4 |

OTHER REFERENCES
Kiver, Color Television Fundamentals 2nd Ed. pp 30— 31, 1964 TK 6670 K5 1964.

*Primary Examiner*—Robert L. Richardson
*Attorney*—Bernard Malina

ABSTRACT: This invention relates to apparatus for converting monochrome (i.e., black and white) television signals into color signals, wherein each gray level in the monochrome signal takes on an associated hue. More particularly, the invention relates to apparatus of the type described in which the luminance of a black and white video signal is utilized to phase modulate a color carrier signal.

INVENTOR.
IRVING MOSKOVITZ
By T. N. Spencer
Attorney

INVENTOR.
IRVING MOSKOWITZ
BY [signature]
Attorney

APPARATUS FOR CONVERTING MONOCHROME TELEVISION SIGNALS TO COLOR SIGNALS

BACKGROUND OF THE INVENTION

Basic color television transmitting equipment is now well established and comprises a color camera which, by means of filters, produces red, green and blue video signals. These signals, in turn, are employed in rather complicated logic circuitry to phase modulate a color carrier signal characteristically having a frequency of about 3.58 megacycles.

In television broadcasting, it is necessary to provide station breaks, commercials and the like wherein a stationary image is televised. It is, of course, possible to televise such stationary images in color with the use of a full color camera setup; however this ties up a costly television chain to the point where smaller stations usually cannot afford to televise local commercials or the like in color, meaning that a continuous color picture at the receiver must be interrupted by black and white periods.

SUMMARY OF THE INVENTION

As an overall object, the present invention provides means for producing a simulated color television signal from a monochrome video signal derived from a conventional black and white television camera.

Another object of the invention is to provide means for converting a monochrome video signal into a color video signal wherein the color of a particular image is dependent upon its luminance in the black and white video signal.

A further object of the invention is to provide means of the type described for converting a monochrome video signal into a color signal, and including apparatus for selecting at will the color desired for an object of a particular luminance in the black and white video signal.

In accordance with the invention, there is provided, in combination with a monochrome television camera, means for converting the monochrome video signal from the camera into a simulated video signal comprising a phase modulator, means for feeding a color carrier signal to the phase modulator, and means for feeding the monochrome video signal from the camera to the phase modulator whereby the phase shift produced in the color carrier will be a function of the instantaneous luminance of the monochrome video signal. In this way, very dark objects in the monochrome video signal, for example, will have one hue in the spectrum; the next lighter object will have an adjacent hue in the color spectrum; a still lighter object will have still a different hue and so on until the lightest object is reached which has a hue approaching that of the darkest object such that the complete color circle has been completed.

Further, in accordance with the invention, the color of a specific object in an image can be selected by applying an appropriate bias to the phase modulator. For example, in advertising an object which is predominantly red, the bias on the modulator may be adjusted whereby the monochrome luminance of the red object will produce a phase shift in the color carrier such that it appears red on the receiver. The color of all other background objects will be dependent upon their luminance rather than their true color; however, a sufficiently good simulated color signal is produced for purposes of commercials, station breaks and the like.

The above and other objects and features of the invention will become apparent from the following detailed description taken in connection with the accompanying drawings which form a part of this specification, and in which.

Figure 1:
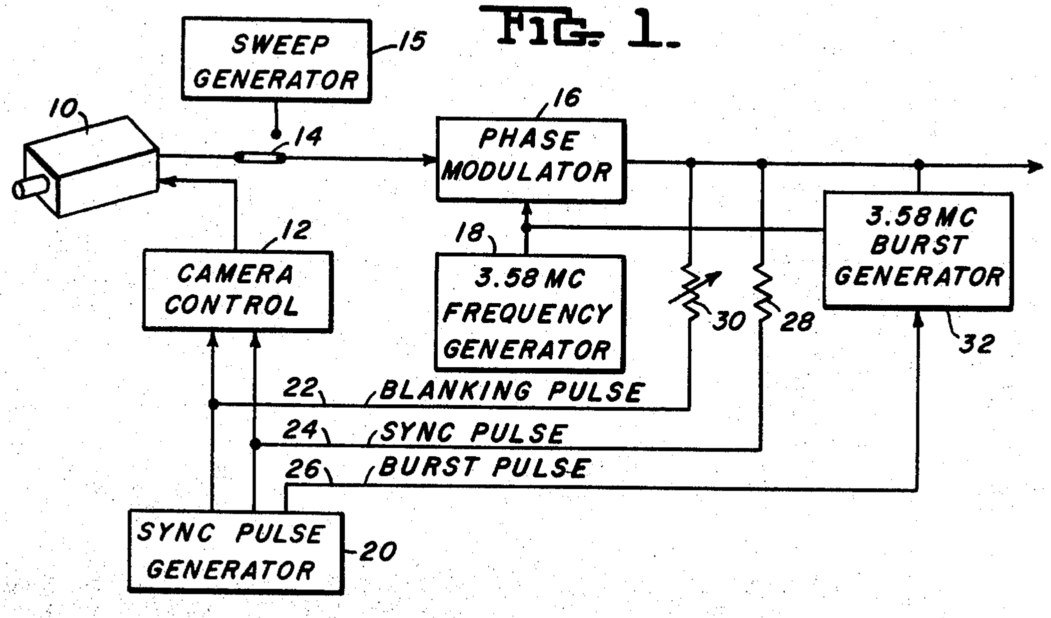
FIG. 1 is a block diagram of the overall color synthesizing system of the invention.

With reference now to the drawings, and particularly to FIG. 1, the system shown includes a black and white television camera 10 having its input connected to a camera control circuit 12. The output of the camera 10, comprising a monochrome video signal, is applied through switch 14 to a phase modulator 16, hereinafter described in detail. In the phase modulator 16, a 3.58 megacycle color carrier signal from frequency generator 18 is phase modulated as a function of the instantaneous amplitude or luminance of the monochrome video signal from camera 10.

As shown, the circuitry also includes a sync pulse generator 20 which produces a blanking pulse on lead 22, a sync pulse on lead 24 and a burst pulse on lead 26. The blanking and sync pulses are applied to the camera control circuit 12 in accordance with conventional techniques and are also added to the output of the phase modulator through resistors 28 and 30. Resistor 30 in the blanking pulse on lead 22 in variable as shown such that the magnitude of the blanking pulse may be varied. The burst pulse 26 acts as a gating signal in a 3.58 megacycle burst generator 32 having applied thereto the output of the frequency generator 18. As will be seen, the resulting burst at the output of the generator 32 is also added to the output of the phase modulator 16.

Figure 2:
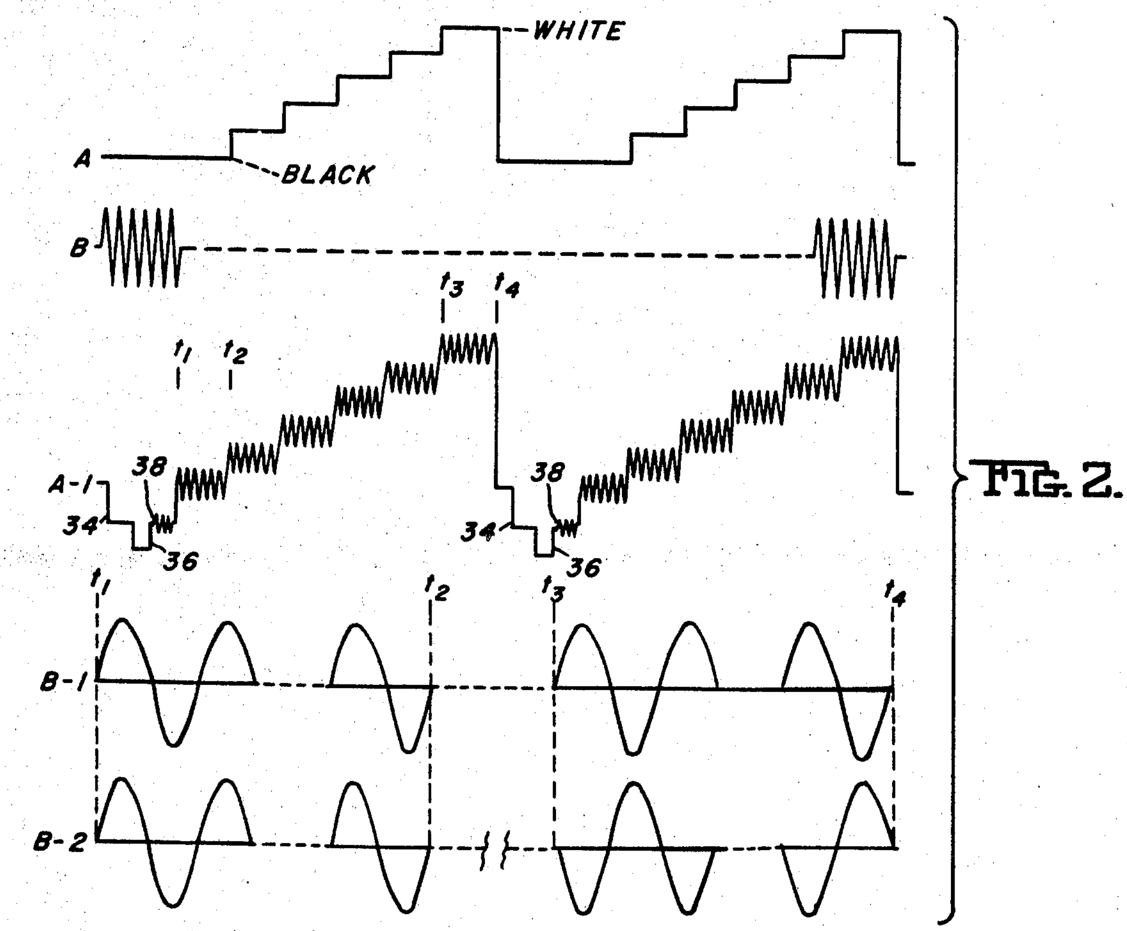
FIG. 2 is a series of waveforms appearing at various points in the circuit of FIG. 1.

Operation of the circuit of FIG. 1 can best be understood by reference to FIG. 2 wherein waveform A represents the monochrome video output signal from the camera 10. For purposes of illustration, it will be assumed that the camera is scanning a series of stripes or gradings which are successively lighter. Thus, as the camera starts its scan, it will scan over a black stripe and then scan gray stripes of successively lesser darkness until, at the end of the scan, it scans a white stripe. Of course, in actual practice, the video output signal from the camera 10 will ordinarily not be as uniform or symmetrical as that shown by waveform A, the particular video waveform shown in FIG. 2 being selected for purposes of illustration only.

The output of the 3.58 megacycle frequency generator 18 appears as waveform B and is a signal of constant frequency and fixed phase relationship. In the phase modulator, the waveform A is added to waveform B and, at the same time, the color subcarrier (waveform B) is phase modulated dependent upon the luminance (i.e., degree of lightness or darkness) of the input monochrome video signal. Thus, the output waveform from the phase modulator 16, after having blanking pulses, sync pulses and color bursts added thereto, will appear somewhat as waveform A-1 of FIG. 2. Waveforms B-1 and B-2 are expanded waveforms of the waveforms B and A-1. Thus, between times $t_1$ and $t_2$ in waveform A-1, the expanded waveform B-1 of the output from frequency generator 18 comprises a sine wave signal. Furthermore, it will be assumed that at the black level of luminance, no phase modulation occurs with the result that the output waveform B-2 between times $t_1$ and $t_2$ is in phase with the sine wave signal in waveform B-1.

However, between times $t_3$ and $t_4$ it will be seen that the expanded waveform B-2 is 180° out of phase with the expanded waveform B-1 at the output of the frequency generator 18. In between the black and white levels, of course, the phase will vary progressively, and the phase of any particular luminescent value, which determines the color at the receiver, will be dependent upon the lightness or darkness of the object being scanned by the camera 10. This, of course, is in contrast to a conventional color television system wherein the phase of the 3.58 megacycle color subcarrier is dependent upon the actual hue of an object rather than upon its lightness or darkness.

Added to the waveform A-1 are blanking pulses 34, the magnitude of which may be varied by varying the variable resistor 30. As shown, a blanking pulse occurs at the beginning of each sweep of the electron beam of the camera 10. Superimposed on the blanking pulses 34 are sync pulses 36 together with bursts 38 of the 3.58 megacycle color carrier signal. The color bursts 38 are necessary since phase modulation requires that the phase-modulated carrier be compared with a reference signal. In the case of the color subcarrier, therefore, it is necessary to have a 3.58 megacycle sine wave with the exact zero phase so that it can be electronically compared cycle by cycle with the chroma signal at the receiver and demodulated to derive actual hue values.

If desired, the modulator 16 may be disconnected from the camera 10 by switch 14 and connected to a sweep generator 15. When so connected to the sweep generator, the output of the modulator will sweep through the entire color spectrum repeatedly, whereby a rainbow or theater marquee effect can be produced on a receiving screen. This effect can also be impressed upon an image, in which case both the camera 10 and sweep generator 15 will be connected to the modulator 16 at the same time.

Figure 3:
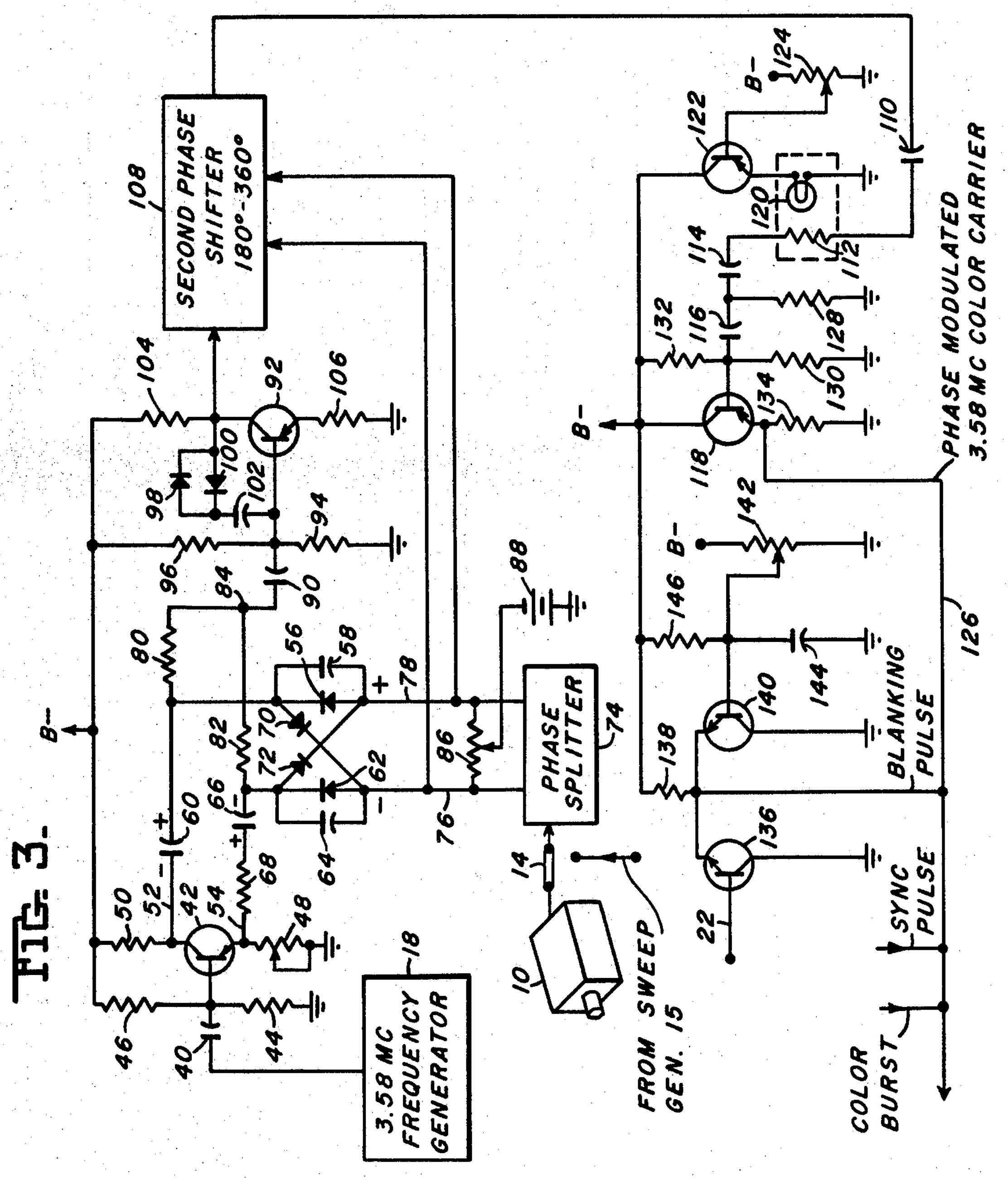
FIG. 3 is a detailed schematic diagram of the phase modulator and illumination and saturation control circuitry of the system shown in FIG. 1.

With reference now to FIG. 3, the detailed circuitry of the phase modulator is shown. The output of the 3.58 megacycle frequency generator 18 is applied via capacitor 40 to the base of the PNP transistor 42. As shown, the base of the transistor 42 is connected to ground resistor 44 and to a source of B− potential through resistor 46. The emitter of transistor 42 is connected to ground through variable resistor 48 and its collector is connected to the same source of B− potential through resistor 50. Outputs are taken from both the emitter and collector of the transistor 42; and it will be immediately apparent that the circuitry just described comprises a phase splitter in which the 3.58 megacycle signal on lead 52 is 180° out of phase with respect to that on lead 54.

The phase splitting circuitry itself comprises a first diode 56 and capacitor 58 in parallel and having one end of the parallel combination connected through capacitor 60 to the collector of the transistor 42. The phase splitter also includes a second diode 62 and capacitor 64 in parallel, with one end of the parallel combination being connected through capacitor 66 and resistor 68 to the emitter of transistor 42. The cathode of diode 56 is connected through diode 70 to the anode of diode 62; and, in a similar manner, the cathode of diode 62 is connected through diode 72 to the anode of the diode 56.

The output of the monochrome television camera 10 is first applied to a phase splitter 74 such that the output of the phase splitter on leads 76 and 78 comprises two monochrome video signals 180° out of phase and of equal amplitude. The one lead 78 is connected to the anode of diode 56; while the other lead 76 is connected to the anode of diode 62.

In the operation of the circuit, it will be assumed that the monochrome video output of the camera 10 is at the white level shown by waveform A in FIG. 2 and that the polarity of the output of the phase splitter 74 is as indicated on leads 76 and 78. Under these circumstances, diodes 56 and 70 will be biased in the forward direction while diodes 62 and 72 are biased to cutoff and, in effect, act as open circuits. Consequently, the signal on lead 52 will be effectively shorted to ground; and the output at point 84 will be the signal on lead 54 which has been shifted in phase by 90° due to capacitor 64. During this time, diode 70 acts as an interconnection between leads 76 and 78 and prevents the video signal from circuit 74 from entering the output at point 84. At the other extreme of the video waveform (i.e., the black level), the polarities on leads 76 and 78 will be reversed whereby diodes 62 and 72 are now biased in the forward direction, diode 72 acting as a closed circuit connection between leads 76 and 78. Between these two extremes, the output signal through resistors 80 and 82 and appearing at summing point 84 will shift through 180°, the amount of the phase shift effected being dependent upon the magnitude or amplitude of the monochrome video signal applied to leads 76 and 78 through the phase splitter 74. That is, diodes 56 and 62 act as variable resistors in shunt with capacitors 58 and 64, thereby varying the phase shift produced in the signals on leads 52 and 54. Addition of these signals at point 84 produces a sine wave shifted in phase in an amount proportional to the amplitude of the video signal from camera 10. The phase shift produced may be varied by means of a potentiometer 86 connected between leads 76 and 78 and having a movable tap connected through battery 88 to ground. With this arrangement, the initial bias on the diodes of the phase shifter may be varied whereby a particular brightness or darkness of the monochrome signal will effect a phase shift indicative of a particular color. Thus, if the apparatus is being utilized to televise a stationary commercial, for example, and if the product being advertised is red in color, the potentiometer 86 will be adjusted until the darkness of the object being advertised in the monochrome signal produces a phase shift in the 3.58 megacycle carrier such that it appears red on the receiving tube screen. All other background objects will then have a color dependent upon their brightness or darkness in comparison with the major object being advertised.

The output of the phase shifter at summing point 84 is applied through capacitor 90 to the base of a second PNP transistor 92. This same base is connected, as shown, through resistor 94 to ground and to the B− voltage supply through resistor 96. Connected between the collector and base of the transistor 92 is a pair of diodes 98 and 100 connected in back-to-back parallel relationship, the two diodes being in series with a capacitor 102. The collector of transistor 92 is connected to the B− voltage source through resistor 104; and its emitter is connected to ground through resistor 106.

The arrangement just described comprises a clipper wherein the 3.58 megacycle subcarrier appearing at summing point 84 is limited. This is necessary due to the fact that the amplitude of the 3.58 megacycle carrier will be varied in the phase modulation process wherein signals on leads 52 and 54 are added.

Up to this point, the phase of the 3.58 megacycle color carrier can be shifted through only 180°. Therefore, in order to effect a complete 360° phase shift, it is necessary to pass the output from transistor 92 through a second phase shift circuit 108 which is identical to that just described. That is, the 3.58 megacycle color carrier, shifted in phase through a maximum of 180°, is applied through a phase splitter in the second phase shift circuit 108, thence through the phase shifter itself to which the leads 76 and 78 are connected; and then through a clipper or limiter including a transistor corresponding to transistor 92.

The output of the second phase shifter 108 now appears somewhat as waveform A-1 in I FIG. 2. This signal is applied through capacitor 110, a light sensitive resistor 112, and capacitors 114 and 116 to the base of a cathode follower NPN transistor 118. The resistance of the resistor 112 is controlled by means of a lamp 120 included in the emitter-to-collector circuit of transistor 122. The base of transistor 122, in turn, is connected to a potentiometer 124 such that the brightness of lamp 120 and, hence, the resistance of resistor 112 can be controlled by the position of the tap on potentiometer 124. As will be understood, the position of the tap on potentiometer 124 thus controls the saturation or overall intensity of the modulated color signal which now appears on lead 126. As shown, the junction of capacitors 116 and 114 is connected to ground through resistor 128; the base of transistor 118 is connected to ground through resistor 130 and to the B− voltage source through resistor 132; and the emitter of the cathode follower transistor 118 is connected to ground through resistor 134.

The blanking pulse appearing on lead 22 in FIG. 1 is applied to the base of a transistor 136 having its collector connected directly to ground and its emitter connected to the B− voltage source through resistor 138. A companion transistor 140 also has its collector connected directly to ground and its emitter connected to the B− voltage source through resistor 138. The base of transistor 140, in turn, is connected to the movable tap on a potentiometer 142, this same base being connected to ground through capacitor 144 and to the B− voltage source through resistor 146. With the arrangement shown, variation of the movable tap on potentiometer 142 will vary the degree of conduction through transistor 140 and, hence, will vary the bias level at the emitter of transistor 136. This, in turn, varies the magnitude or amplitude of the blanking pulse output from transistor 136 as applied to output lead 126. As the amplitude of the blanking pulse is increased or decreased the direct current level of the video signal in a distant receiver is correspondingly varied in the automatic gain control circuit of that receiver. Consequently, by varying the position of the movable tap on potentiometer 142, the amplitude of the blanking pulse is varied as is the overall luminance of the signal as received at a distant receiver.

Also applied to the output lead 126 are the sync pulse 36 shown in FIG. 2 as well as the color burst 38, such that the composite output signal now appears as waveform A-1 in FIG. 2.

The present invention thus provides a means for converting a monochrome video signal into a simulated color signal by means of a unique phase modulation technique. Although the invention has been shown in connection with a certain specific embodiment, it will be readily apparent to those skilled in the art that various changes in form and arrangement of parts may be made to suit requirements without departing from the spirit and scope of the invention.

I claim:

1. Apparatus for converting a monochrome video signal into an encoded video signal comprising phase modulator means having a first input for the application thereto of a monochrome video signal and a second input for the application thereto of a color carrier signal, said phase modulator means being operative to phase modulate said color carrier signal in response to said monochrome video signal, sweep generator means and means for selectively connecting said sweep generator means to said phase modulator means whereby the output of said phase modulator means will repeatedly sweep through the color spectrum to thereby produce an encoded color video signal.

2. Apparatus as defined in claim 1 wherein said modulator means comprises a single phase modulator operative to phase modulate said color carrier signal in accordance with said monochrome video signal.

3. Apparatus as defined in claim 1 wherein said phase modulator means is operative to phase shift said color carrier signal in accordance with the luminance level of said monochrome video signal.

4. Apparatus as defined in claim 3 wherein the phase shift produced by said phase modulator means varies directly with the luminance level of said monochrome video signal.

5. Apparatus as defined in claim 1 including means for generating a blanking pulse, means for generating a sync pulse, means for generating a color burst and means for adding the blanking pulse, the sync pulse and the color burst to the output of said phase modulator means.

6. Apparatus for converting a monochrome video signal into an encoded video signal comprising phase modulator means having a first input for the application thereto of a monochrome video signal and a second input for the application thereto of a color carrier signal, and a phase splitter having an input for the application thereto of said monochrome video signal and a pair of outputs respectively providing two signals 180° out of phase with respect to each other and means for applying said two signals to said phase modulator means, said phase modulator means being operative to phase modulate said color carrier signal in response to said monochrome video signal to thereby produce an encoded color video signal.

7. Apparatus for converting a monochrome video signal into an encoded video signal comprising phase modulator means having a first input for the application thereto monochrome video signal and a second input for the application thereto of a color carrier signal, said phase modulator means being operative to phase modulate said color carrier signal in response to said monochrome video signal, to produce a modulated color carrier, said phase modulator means including means for clipping the modulated color carrier to thereby produce an encoded color video signal.